United States Patent [19]

Koren

[11] Patent Number: 5,754,593
[45] Date of Patent: May 19, 1998

[54] WRITE EQUALIZATION FOR PARTIAL RESPONSE CHANNELS

[75] Inventor: Norman Lee Koren, Encinitas, Calif.

[73] Assignee: Eastman Kodak Company, Rochester, N.Y.

[21] Appl. No.: 564,698

[22] Filed: Nov. 29, 1995

[51] Int. Cl.$^6$ .................................................. H04L 5/12
[52] U.S. Cl. .................................. 375/263; 375/296
[58] Field of Search .......................... 360/65; 375/263, 375/229, 253, 254, 290, 296, 355

[56] References Cited

U.S. PATENT DOCUMENTS

| | | | |
|---|---|---|---|
| 5,267,096 | 11/1993 | Bachan et al. | 360/41 |
| 5,339,202 | 8/1994 | Heinz et al. | 360/46 |
| 5,638,226 | 6/1997 | Koren | 360/40 |

*Primary Examiner*—Stephen Chin
*Assistant Examiner*—Kevin Kim
*Attorney, Agent, or Firm*—William F. Noval

[57] ABSTRACT

A method of write equalization in digital data recording systems comprising the steps of: providing a digital data signal to be recorded on recordable media, wherein the digital data signal includes 1s and 0s spaced at time interval T with 1s represented by a signal transition between first and second signal levels and 0s represented by no signal transition, and in which there is a minimum of d+1 intervals T between transitions; providing write equalization pulses of width WT for each 0 starting with the (d+1)th 0 following a 1; and causing a transition of a write equalization pulse adjacent to a 1 to occupy the same position as the transition of the 1 so that there is no transition for the 1. In one embodiment, the initial transition of the first added 0 pulse following a 1 is advanced in time so that it occupies the same position as the transition for the 1. In a second embodiment, the second transition of the last added 0 pulse preceding a 1 is delayed in time so that it occupies the same transition as the transition for the 1.

13 Claims, 2 Drawing Sheets

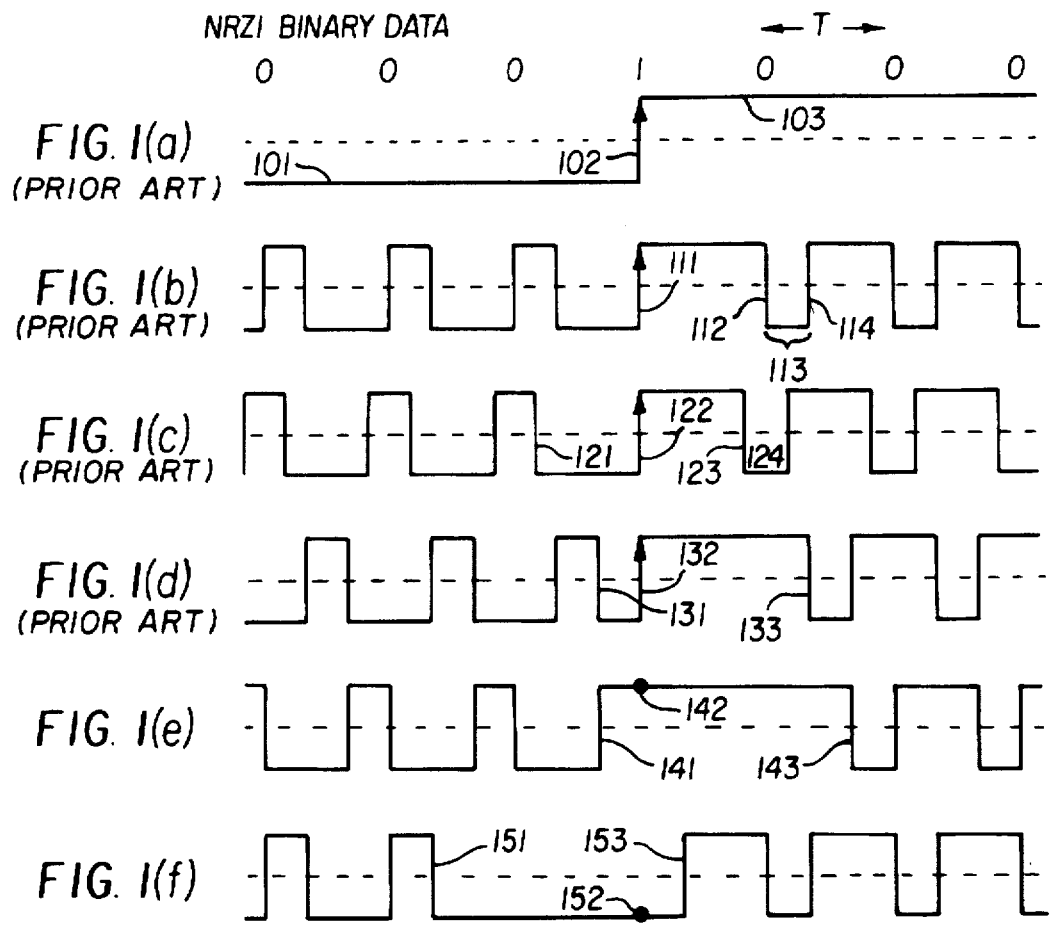
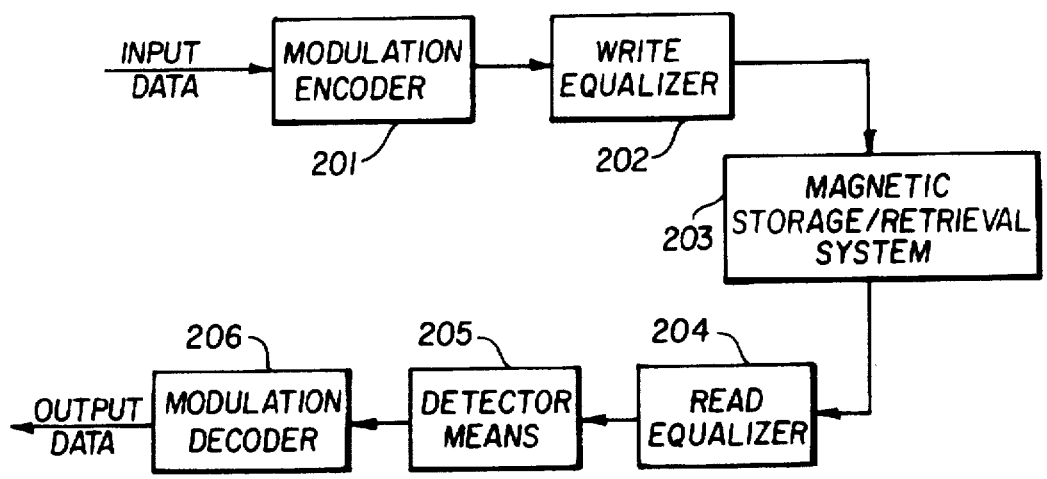
FIG. 3

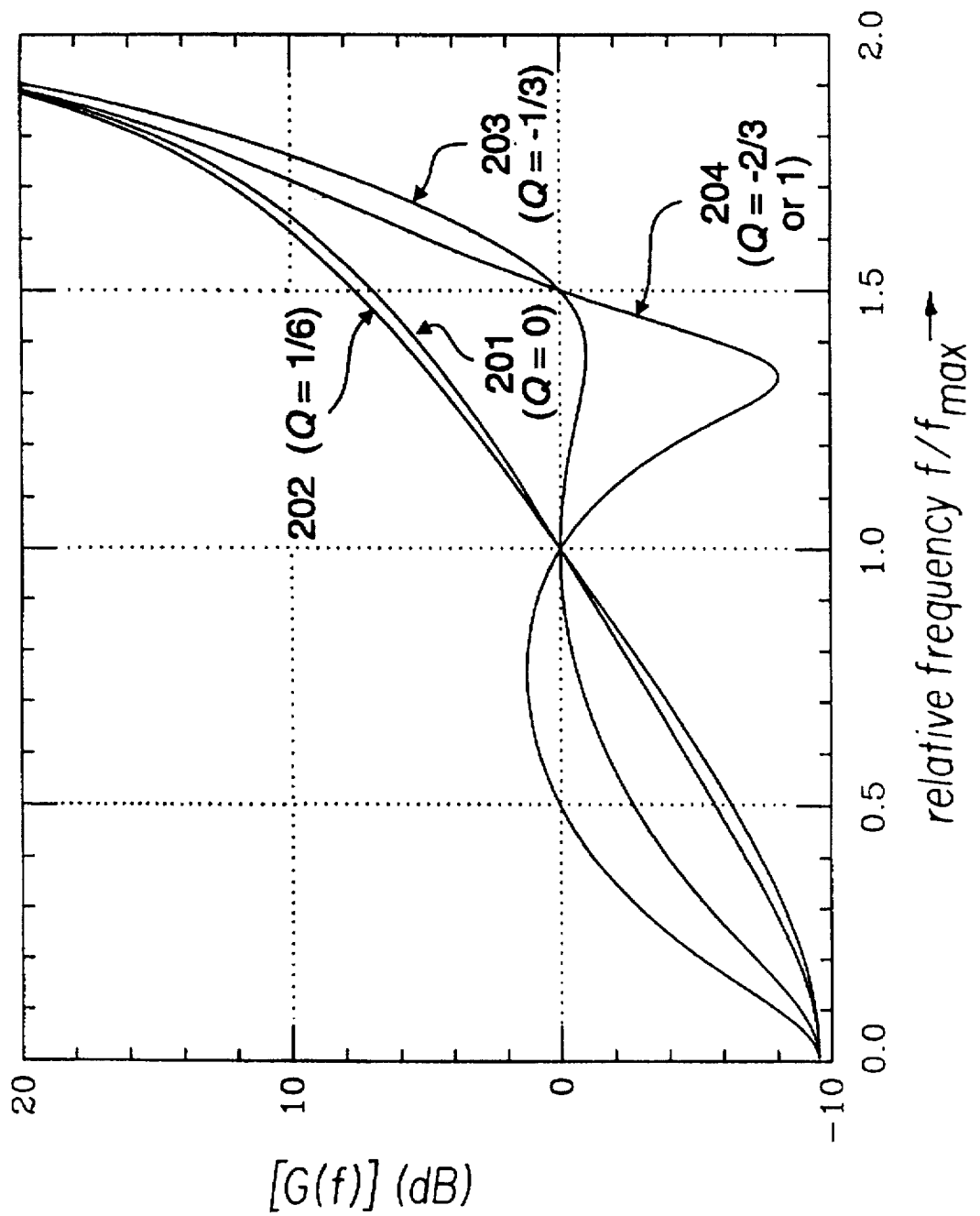

WRITE EQUALIZATION FOR PARTIAL RESPONSE CHANNELS

FIELD OF THE INVENTION

The present invention relates in general to systems and methods of high density magnetic recording and retrieval of digital data, and relates more particularly to those systems that employ recording media that can support the high written densities required for write equalization. More specifically, the present invention relates to systems employing partial response equalization with maximum likelihood detection and to systems employing magneto resistive and inductive read transducers.

BACKGROUND OF THE INVENTION

In NRZI digital magnetic recording systems, digital data (0s and 1s) is recorded sequentially using a write current transition for a 1 and no transition for a 0. With a run-length-limited (RLL) modulation code of clock period T that has a minimum of d 0s between successive 1s, a conventional write equalizer adds one or more pulses of width WT to the write current for each 0 starting with the (d+1)th 0 after a 1. Transitions in the added pulses are normally separated by at least WT from the 1 transitions to avoid excessive write frequencies. Write equalization performed according to this rule is a linear operation with a transfer function that attenuates channel response at frequencies below the maximum written frequency $f_{max}=1/(2(d+1)T)$ and generally boosts it at frequencies above $f_{max}$. Partial response maximum likelihood (PRML) channels, which offer great potential for increasing recording density, typically have equalizer responses of zero at and above $f_{cut}=1/(2T)$, where $f_{cut}=f_{max}$ for the (0,k) RLL codes used in most PRML channels. Conventional write equalization, which attenuates channel response in the critical region below $f_{max}$, fails to improve PRML channel performance.

The following definitions will be useful in understanding the present invention.

NRZI RECORDING—In NRZI (Non Return To Zero) digital magnetic recording, a binary data sequence of 0s and 1s is recorded on a magnetic medium (typically tape or disk) that alternates between two magnetization states. A 1 is recorded as a change in the magnetization state of the medium (a magnetic transition), and a 0 as the absence of a magnetic transition. NRZI data is recorded using a write head energized by an electrical current that alternates polarity (has a transition) for a 1 and remains constant for a 0.

RUN LENGTH LIMITED (RLL) MODULATION CODES—In standard m/n (d,k) RLL modulation codes, m data bits are mapped into n code bits, for a code rate of r=m/n. There is a minimum of d and a maximum of k code 0s between adjacent 1s. The clock period of the code is $T=m/nT_d$, where $T_d$ is the data period. The run length constraints can be described alternately as a minimum of d+1 and a maximum of k+1 clock intervals T between adjacent 1s. The minimum time between transitions is $T_{min}=(d+1)T$. The detection window, $T_w$, is equal T. The purpose of RLL codes is to make the channel self-clocking by limiting the maximum run of 0s, and in certain cases to increase $T_{min}$ to a value greater than $T_d$. A readback pulse peak detected anywhere within a window is assumed to have been written at the center of that window.

WRITE EQUALIZATION—adds short duration pulses to the write current, each of which consists of two transitions. The added pulses have too short a wavelength to be resolved during readback. Their effect is to slim readback pulses resulting from data 1 transitions. This enhances the performance of certain peak detector channels. Write equalization adds one or more pulses of width WT to the write current for each 0 starting at the Pth 0 following a 1, where P=d+1. The transition for a 1 may be delayed by QT from the time corresponding to the 1, or alternatively, the first transition in the added pulse for each 0 may be advanced by QT from the time corresponding to the 0. The period of the added pulses is RT, i.e., there are 1/R added pulses per clock period T. For these rules, write equalization is a linear process with the following transfer function.

$$G_{wreq}(\omega) = e^{-j\omega TQ} - \frac{(1 - e^{-j\omega TW})(1 + e^{-j\omega TP})}{(1 - e^{-j\omega TR})} \quad (1)$$

The transfer function at d.c. ($\omega=2\pi f=0$) is $|G_{wreq}(0)|=1-2W/R$. It is equal to 0 when W/R=0.5. The transfer function at the maximum readback frequency, $f_{max}=1/(2(d+1T)=1/(2PT)$, is always 1 because there are no added pulses at this frequency. Linearity implies that a data pattern can be simulated by linearly superposing the write equalized . . . 0001000 . . . data pattern, which is called the write equalized isolated pulse. This pulse can also be used as the basis of read equalizer design. For the write equalized systems previously described, $0<W/R\leq0.5$, and 1/R is an integer usually set equal to 1 to avoid excessive write frequencies.

PARTIAL RESPONSE EQUALIZATION—In partial response (PR) equalization, the response of the channel to a recorded transition (known as the isolated readback pulse or the step response) has a controlled amount of intersymbol interference (ISI) with adjacent readback pulses. PR equalization maps a two level write signal to a multi-level read signal. Optimum data recovery in PR channels requires a maximum likelihood detector, of which the Viterbi detector is the best known example. Partial response equalizers generally require less slimming than peak detector equalizers operating at the same data density, and hence have less high frequency boost, resulting in an improved signal-to-noise ratio (SNR).

PR channels are characterized by their pulse response polynomials, which is their response to a recorded pulse (a pair of written transitions separated by time T) at the readback signal sampling times, which normally have an increment of T. A minimum bandwidth channel with sample time increment T has a cutoff frequency (a response null) at $f_{cut}=\frac{1}{2}T$. Partial response channels proposed for magnetic recording have pulse response polynomials of the form $(1-D)^m(1+D)^n$, where $m\geq0$ and $n\geq1$, and D is a delay operator equivalent to time T. Since $n\geq1$, a (1+D) term is always present in the pulse response. The high frequency rolloff (the response just below $f_{cut}$) of a channel with a $(1+D)^n$ term in its pulse response polynomial is $\cos^n(\pi f/2f_{cut})$.

The best known partial response channel, and the one which has the widest commercial application, is partial response type 4, or PR4, which has a pulse response polynomial of $(1-D)(1+D)=1-D^2$. Its normalized pulse response at sampling times is {1,0,-1}. It has the advantage that alternate samples can be sent to one of two separate two state Viterbi detectors, each operating at half the channel rate. PR4 is generally used with (0,k) RLL modulation codes. The step response of a minimum bandwidth PR4 equalizer has a high frequency rolloff of $\cos(\pi f/2f_{cut})$, where $f_{cut}=f_{max}$. Since this function rises rapidly below $f_{max}$, a good SNR is desirable in the region just below $f_{max}$ for good channel performance. There is a need to improve performance in this region.

In conventional write equalization, the transitions in the added pulses are separated from the transitions for 1s by a time interval at least equal to the width of the added pulses. If the separation were any less, the effective write frequencies would be increased. This would be undesirable since many recording systems operate close to the frequency limits of their write drivers and heads, and nonlinear bit shift (the shift of a written transition due to demagnetizing fields from previously written transitions) would also be increased.

SUMMARY OF THE INVENTION

According to the present invention there is provided a solution to the needs and problems noted above. According to an aspect of the present invention there is provided a method and apparatus for write equalization that locates the added pulses for 0s so that either (1) the first transition of the first added 0 pulse following a 1 occupies the same position as the 1 transition, thereby canceling both transitions, or (2) the last transition of the last added 0 pulse preceding a 1 occupies the same position as the 1 transition, also canceling both transitions.

According to a feature of the present invention, there is provided a method of write equalization in digital data recording systems comprising the steps of:

providing a digital data signal to be recorded on recordable media, wherein said digital data signal includes 1s and 0s spaced at time interval T with 1s represented by a signal transition between first and second signal levels and 0s represented by no signal transition;

providing write equalization pulses of width WT for selected 0s; and causing a transition of a write equalization pulse adjacent to a 1 to occupy the same position as the transition of the 1 so that there is no transition for the 1.

Advantageous Effect of the Invention

The write equalization method of the present invention has the following advantages.

1. The linearity of write equalization is maintained. The isolated pulse generated in response to the ... 0001000 ... data pattern can still be used to calculate the waveform for complex data pattern by means of linear supposition.

2. There is no affect on the design of the modulation code, its associated hardware (the encoder and decoder), or the detector. The PRML read equalizer topology is changed slightly, if at all, but the read equalizer components or parameters must be changed somewhat due to signal equalization that takes place during the write process. The read equalizer will have less boost in the $f_{max}/2 < f < f_{max}$ frequency range, where boost is supplied by the write equalizer. The procedures and techniques for designing the read equalizer are entirely unchanged. Read equalizer design is normally based on shaping either the step response (NRZI . . . 0001000 . . . ) or the pulse response (NRZI . . . 00011000 . . . ). The only difference brought about by the present invention is that these responses will be taken after write equalization has been applied, i.e. with added pulses in the write current.

3. Write equalization reduces the d.c. content of the write current, eliminating it in the case where W/R=½. It therefore reduces or eliminates long recorded wavelengths. This reduces the flux-amplitude differences between high and low recorded densities, allowing maximum use of the linear operation region of magnetoresistive read heads. This is particularly important for unshielded MR heads, such as the UMR (single element) and DMR (dual element) MR heads, which are easily driven into saturation by the flux arising from long recorded wavelengths.

4. Overwrite modulation is reduced by reducing or eliminating long wavelength recorded data. Overwrite modulation tends to arise from long wavelength data patterns recorded deep within the magnetic media. Short wavelength recorded data on the other hand is not a significant component of overwrite due spacing losses.

5. Known write equalization boosts channel response above the maximum written frequency $f_{max}$ and reduces it below $f_{max}$. Partial response channels do not use signals at frequencies above $f_{cut}=1/(2(d+1T)$, but require good signal-to-noise ratios at frequencies below $f_{cut}$. $f_{cut}=f_{max}$ for (0,k) RLL modulation codes widely used for PR channels. Known write equalization degrades the performance of PR channels by decreasing the detector SNR. The present invention boosts channel response between $f_{max}/2$ and $f_{max}$, and hence improves the performance of PR channels by increasing the detector SNR. Although this SNR increase is only on the order of 1 dB, when combined with the improved linearity of MR head operation and the reduced overwrite modulation, the overall performance of PR channels is significantly improved.

6. The method of the present invention is advantageous for partial response recording.

BRIEF DESCRIPTION OF THE DRAWINGS

FIGS. 1(a)–1(f) are diagrammatic views of signal waveforms useful in describing the present invention.

FIG. 2 is a graphical view of the write equalization transfer function IG(f)I in dB vs. relative frequency $f/f_{max}$.

FIG. 3 is a block diagram of apparatus incorporating the present invention.

DESCRIPTION OF THE PREFERRED EMBODIMENTS

Referring now to FIG. 3, there is shown a block diagram of a digital data system incorporating the present invention. As shown, system 200 include modulation encoder 201 which receives input digital data and encodes the digital data as run length limited coded data. Write equalizer 202, according to the present invention, adds write equalization pulses to the encoded data, as will be explained in greater detail later. Magnetic storage/retrieval system 203 includes a write driver, write means, such as a magnetic write head, a storage medium, such as magnetic tape or disk, read means, such as a magnetic (e.g., magnetoresistive) read head, and a read preamplifier. The read back signal is equalized by read equalizer 204. Read equalizer 204 can be implemented as either an analog circuit, a digital circuit, or a combination of the two. When used with the present invention, partial response equalization is assumed.

Detector means 205 detects partial response signal from read equalizer 204. In typical applications, a maximum likelihood detector, such as a Viterbi detector, is employed. Modulation decoder 206 decodes the detected signal from detector means 206 into output digital data.

Referring now to FIGS. 1 and 2, there will be described in greater detail the method and apparatus of the present invention. FIGS. 1(a)–1(f) illustrate write currents for the NRZI data pattern ... 0001000 ... ; FIG. 1(a) without write equalization. FIGS. 1(b)–1(d) for known write equalization methods, and FIGS. 1(e), 1(f) for write equalization methods according to the present invention. In all cases write equalization parameters are W=⅓, P=d+1=1 (a(0,k) RLL modulation code), and R=1. Each case has a different value of Q as noted.

FIG. 2 shows the write equalizer transfer function in dB as a function of frequency ($f/f_{max}$) for several cases of known write equalization methods and for the write equalization methods according to the present invention. Write equalization parameters are the same as in FIG. 1. For all cases the transfer function at d.c. ($f$=0) is $1-2W/R=\frac{1}{3}=-9.54$ dB.

The response of the system to the NZRI . . . 0001000 . . . data pattern in FIG. 1 is an isolated pulse that can be used for read equalizer design and for calculating waveforms of complex data patterns by means of linear superposition. This holds true with and without write equalization. All of the write equalization methods illustrated in FIGS. 1(b)–(f) have one added pulse width WT=T/3 per 0 starting with the first 0 following a 1, i.e., write equalization parameters W=⅓, P=d+1=1, and R=1. FIGS. 1(b)–(f) have different values of Q, the relative delay of the 1 transition (or relative advance of the first transition in a 0 pulse). It is understood that other values of W could have been used for this example. In practical write equalization, ¼≦W≦½, although the theoretical lower and upper limits of W are 0 and 1.

FIGS. 1(a), 1(b), 1(c), and 1(d) show known waveforms.

FIG. 1(a) illustrates the write current waveform without write equalization. Write current alternates between a negative value 101 and a positive value of equal amplitude 103. Transition 102, which represents a 1, is located at the time of its corresponding 1.

FIG. 1(b) illustrates the waveform of the write equalized write current in which the first transition of each added pulse is located at the time of its corresponding 0. This is the equivalent to write equalization parameter Q=0, and is illustrated for the first added pulse 113 following data 1 transition 111, which is comprised of first transition 112 and second transition 114 separated by WT. Data transition 111 is written at the time of its corresponding 1. The first transition 112 of pulse 113 is written at the time of its corresponding 0, i.e., the first 0 following the 1.

FIG. 1(c) illustrates the waveform of the write equalized write current in which the first transition of each added 0 pulse is advanced by T/6 from the time of its corresponding 0. This is equivalent to write equalization parameter Q=⅙, and is illustrated by the first transition 123 of the first added pulse 124 following data 1 transition 122. Transition 123 is advanced by T/6 from the time of its corresponding 0. Data 1 transition 122 is located exactly half way between the last transition 121 of the preceding added pulse and the first transition 123 of the first following added pulse. Referring to FIG. 2, this write equalization has the greatest high frequency boost (i.e., the largest transfer function 202 at frequencies between $f_{max}$ and $2f_{max}$) of any of the write equalization methods with other values of Q but the same values of the other parameters (W, P, and R). This case is often advantageous for peak detector channels.

FIG. 1(d) illustrates the waveform for the write equalized write current in which the first transition of each added 0 pulse is delayed by T/3 from the time of its corresponding 0. This is equivalent to write equalization parameter Q=−⅓, and is illustrated by the first transition 133 of the first added pulse following data 1 transition 132. Transition 133 is delayed by T/3 from the time of its corresponding 0. Referring to FIG. 2, the transfer function 203 for this write equalization is the smallest at high frequencies (between $f_{max}$ and $2f_{max}$) but the largest at medium frequencies (between $f_{max}/2$ and $f_{max}$) of any conventional write equalization. This results in the best performance for PRML channels, which have no response above $f_{max}$ but considerable response between $f_{max}/2$ and $f_{max}$. The spacing between data 1 transition 132 and the nearest transition 131 arising from an added pulse is T/3=TW, which is equal to the width of the added pulses. The magnitude of the transfer function G(w) for this case, in which Q=−⅓, is identical to that of write equalization with Q=⅔, where the first transition of each added 0 pulse is advanced by 2T/3 from the time of its corresponding 0.

It should be noted that in the above examples moving either of the added pulses closer to the data 1 transition would decrease the transfer function at frequencies above $f_{max}$ and increase it at frequencies between $f_{max}/2$ and $f_{max}$. This should improve performance in PRML channels, but it would make the time between the data 1 transition and the closest transition from one of the added pulses less than the width of the added pulses TW. This would increase the required write head frequency response. The flux risetime of write heads is limited by the head material, which may have eddy currents, domain walls, and other phenomena that limit switching speed, as well as by the write driver circuit. Write heads operate near their frequency limits in many systems that employ write equalization. It is therefore inadvisable to increase the required write frequency. Also, the harmful effects of nonlinear bit shift become worse as the spacing between transitions decreases.

In accordance with the present invention, the write equalization methods illustrated in FIGS. 1(e) and 1(f), moves either the first added transition for a 0 following a 1 or the last added transition for a 0 preceding a 1 to the same position as the transition for the 1, thereby eliminating both transitions. Eliminating a data transition is highly counterintuitive and nothing like it has been suggested in the prior art of write equalization.

According to one embodiment of the present invention as illustrated in FIG. 1(e), the write equalized write current waveform shows that the first transition of each added 0 pulse is delayed by 2T/3 from the time of its corresponding 0. This is equivalent to write equalization parameter Q=−⅔, and is illustrated by the first transition 143 of the first added pulse following the 1. Transition 143 is delayed by 2T/3 from the time of its corresponding 0. This write equalization method shifts the last transition of the added pulse for the last 0 preceding the 1 to the same position 142 that the 1 transition would ordinarily occupy, eliminating both transitions. The write current is unchanged between the first transition 141 of the last 0 preceding the 1 and the first transition 143 of the first 0 following the 1. The spacing between these transitions is 2T. Referring to FIG. 2, this write equalization boosts channel response (has a transfer function 204 greater than 1) in the frequency range $f_{max}/2<f<f_{max}$, and it attenuates it for $f>f_{max}$ and $f<f_{max}/2$. This improves PRML channel performance beyond that of any of the known write equalization methods as well as what it would be without write equalization.

In the embodiment illustrated in FIG. 1(f), the write equalized write current shows the waveform in which the first transition of each added 0 pulse is advanced by T from the time of its corresponding 0. This is equivalent to write equalization parameter Q=1. This write equalization method shifts the first transition of the added pulse for the first 0 followed by the 1 to the same position 152 that the 1 transition would ordinarily occupy, thereby eliminating both transitions. The write current is unchanged between the last transition 151 of the last 0 preceding the 1 and the last transition 153 of the first 0 following the 1, the spacing between these transitions is 2T. Referring to FIG. 2, this write equalization has the same transfer function magnitude 204 as the case of Q=−⅔ (FIG. 1(e)). It boosts channel response in the frequency range $f_{max}/2<f<f_{max}$, and attenuates channel response for $f>f_{max}$ and $f<f_{max}/2$.

The invention has been disclosed in detail with respect to preferred embodiments thereof, but it will be understood that variations and modifications can be effected within the spirit and scope of the invention.

What is claimed is:

1. A method of write equalization in digital data recording systems comprising the steps of:

providing a digital data signal to be recorded on recordable media, wherein said digital data signal includes 1s and 0s spaced at time interval T with 1s represented by a signal transition between first and second signal levels and 0s represented by no signal transition;

providing write equalization pulses of width WT for selected 0s; and causing a transition of a write equalization pulse adjacent to a 1 to occupy the same position as the transition of the 1 so that there is no transition for the 1.

2. The method of claim 1 wherein in said causing step, the initial transition of the first added write equalization pulse after a 1 is advanced in time so that it occupies the same position as the transition for the 1, thereby causing the two transitions to cancel, so that there is no transition for the last 1 preceding a zero.

3. The method of claim 1 wherein in said causing step, the second transition of the last added write equalization pulse before a 1 is delayed in time so that it occupies the same transition as the 1, thereby causing the two transitions to cancel, so that there is no written transition for the first 1 following a 0.

4. A method of write equalization in digital data recording systems comprising the steps of:

providing a digital data signal to be recorded on recordable media, wherein said digital data signal includes 1s and 0s spaced at time interval T with is represented by a signal transition between first and second signal levels and 0s represented by no signal transition, and in which there is a minimum of d+1 intervals T between transitions;

providing write equalization pulses of width WT for each 0 starting with the (d+1)th 0 following a 1; and causing a transition of a write equalization pulse adjacent to a 1 to occupy the same position as the transition of the 1 so that there is no transition for the 1.

5. The method of claim 4 wherein in said causing step, the initial transition of the first added write equalization pulse after a 1 is advanced in time so that it occupies the same position as the transition for the 1, thereby causing the two transitions to cancel, so that there is no transition for the last 1 preceding a zero.

6. The method of claim 4 wherein in said causing step, the second transition of the last added write equalization pulse before a 1 is delayed in time so that it occupies the same transition as the 1, thereby causing the two transitions to cancel, so that there is no written transition for the first 1 following a 0.

7. The method of claim 4 wherein in said step of providing write equalization pulses, the initial transition of each added pulse is advanced with respect to the position of its corresponding 0 by time QT.

8. The method of claim 5 wherein in said step of providing write equalization pulses, the initial transition of each added pulse is advanced with respect to the position of its corresponding 0 by time QT, and Q=d+1.

9. The method of claim 6 wherein in said step of providing write equalization pulses, the initial transition of each added pulse is advanced with respect to the position of its corresponding 0 by time QT, and Q=W−1.

10. The method of claim 4 including the steps of writing the write equalized digital data signal on recording media, reading the digital data signal from said recording media, and read equalizing the read digital data signal with a partial response polynomial.

11. The method of claim 10 wherein the read digital data signal is read equalized with the pulse response polynomial of $(1-D)^m(1+D)^n$, where m is equal to or greater than zero and n is equal to or greater than 1.

12. The method of claim 10 wherein said digital data signal is read from said recorded media by means of a magnetoresistive sensor.

13. The method of claim 10 including the step of detecting said read equalized digital data signal by means of a maximum likelihood detector.

* * * * *